United States Patent [19]

Gerber et al.

[11] Patent Number: 6,163,793
[45] Date of Patent: *Dec. 19, 2000

[54] METHOD AND APPARATUS FOR USING A DRIVER PROGRAM EXECUTING ON A HOST PROCESSOR TO CONTROL THE EXECUTION OF CODE ON AN AUXILIARY PROCESSOR

[75] Inventors: Richard Gerber, Hillsboro, Oreg.; Howard J. Kennedy, Jr., Hamilton Square, N.J.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/801,620

[22] Filed: Feb. 18, 1997

Related U.S. Application Data

[63] Continuation of application No. 08/286,264, Aug. 5, 1994, abandoned.

[51] Int. Cl.[7] ........................................... G06F 9/00
[52] U.S. Cl. ............................... 709/103; 709/100
[58] Field of Search .................................. 709/100, 102, 709/104, 105, 107, 106, 103; 710/129, 30; 701/121, 200

[56] References Cited

U.S. PATENT DOCUMENTS

| | | | |
|---|---|---|---|
| 3,408,628 | 10/1968 | Brass et al. | 395/425 |
| 3,629,851 | 12/1971 | Werner | 364/200 |
| 4,214,305 | 7/1980 | Tokita et al. | 364/200 |
| 4,369,494 | 1/1983 | Bilenvlenu et al. | 364/200 |
| 4,590,551 | 5/1986 | Mathews | 364/200 |
| 4,646,231 | 2/1987 | Green et al. | 364/200 |
| 4,855,899 | 8/1989 | Presant | 364/200 |
| 4,860,191 | 8/1989 | Nomura et al. | 364/200 |
| 4,882,674 | 11/1989 | Quint et al. | 364/200 |
| 4,914,570 | 4/1990 | Peacock | 364/200 |
| 4,985,831 | 1/1991 | Dulong et al. | 364/200 |
| 5,113,500 | 5/1992 | Talbott et al. | 395/325 |
| 5,167,028 | 11/1992 | Shires | 395/425 |
| 5,261,095 | 11/1993 | Crawford et al. | 395/650 |
| 5,269,021 | 12/1993 | Denio et al. | 395/700 |
| 5,325,492 | 6/1994 | Bonevento et al. | 395/325 |
| 5,349,656 | 9/1994 | Kaneko et al. | 395/650 |
| 5,355,485 | 10/1994 | Denio et al. | 395/650 |
| 5,404,519 | 4/1995 | Denio | 395/650 |
| 5,418,913 | 5/1995 | Fujimoto | 315/200 |
| 5,442,788 | 8/1995 | Bier | 395/650 |
| 5,475,860 | 12/1995 | Ellison | 395/846 |
| 5,530,858 | 6/1996 | Stanley et al. | 395/650 |
| 5,537,654 | 7/1996 | Bedingfield et al. | 395/834 |
| 5,539,896 | 7/1996 | Lisle | 395/477 |

OTHER PUBLICATIONS

*Intel Smart Video Recorder Pro*, Intel Corporation, 1994, Advertisement (4) pages.

Primary Examiner—Majid A. Banankhah
Attorney, Agent, or Firm—Blakely, Sokoloff, Taylor & Zafman LLP

[57] ABSTRACT

A method and apparatus for using a driver program, executing on a host processor, to control the execution of programs on an auxiliary processor is described. The host processor and auxiliary processor share a storage device. In this storage device, the driver program stores a number of ordered execution control blocks, each containing location information of a corresponding program and execution information for controlling the execution flow on the auxiliary processor. An execution control program, executing on the auxiliary processor, processes the execution control blocks in the order maintained by the driver program. The auxiliary processor processes each execution control block and executes its' corresponding program, taking the action specified by the execution information. In this manner, the driver program indirectly controls the execution of programs on the auxiliary processor.

28 Claims, 8 Drawing Sheets

METHOD AND APPARATUS FOR USING A DRIVER PROGRAM EXECUTING ON A HOST PROCESSOR TO CONTROL THE EXECUTION OF CODE ON AN AUXILIARY PROCESSOR

This is a continuation of application Ser. No. 08/286,264, filed Aug. 5, 1994, now abandoned.

BACKGROUND OF THE INVENTION

1. Field of the Invention

The present invention relates to the field of computer systems. More specifically, the present invention relates to the use of a host processor to control the execution of code on an auxiliary processor.

2. Background Information

Typical computer systems can contain a host processor and an auxiliary processor. In such systems, the host processor is used to control the operation of the auxiliary processor. These computer systems may have an application program and a driver program for execution on the host processor, as well as programs (herein referred to as "auxiliary processor programs") for execution on the auxiliary processor. To process data on the auxiliary processor, the application program interfaces with the driver program. In turn, the driver program interfaces with the auxiliary processor programs to provide for their execution.

In prior art versions of these computer systems, the auxiliary processor executes an execution control program which repeatedly causes the execution of code starting at three predetermined addresses in memory. To execute an auxiliary program, the auxiliary program must be written into the memory starting at one of these predetermined addresses. In this manner, the user may process data on the auxiliary processor using the auxiliary processor programs sold with the computer system or other auxiliary processor programs. However, this prior art method of executing auxiliary processor programs is difficult to use and allows for only limited programmability. In addition, this prior art employs a driver program designed specifically for the auxiliary processor being utilized. Thus, the driver program is not easily modified to support alternative hardware configurations or auxiliary processor upgrades. Finally, the prior art does not provide a means by which the auxiliary processor may notify the host processor upon the completion of a task.

SUMMARY OF THE INVENTION

A method and apparatus for using a driver program, executing on a host processor, to control the execution of programs on an auxiliary processor is described. The host processor and auxiliary processor share a storage device. In this storage device, the driver program stores a number of ordered execution control blocks, each containing location information of a corresponding program and execution information for controlling the execution flow on the auxiliary processor. An execution control program, executing on the auxiliary processor, processes the execution control blocks in the order maintained by the driver program. The auxiliary processor processes each execution control block and executes its' corresponding program, taking the action specified by the execution information. In this manner, the driver program indirectly controls the execution of programs on the auxiliary processor.

In one embodiment, the execution control blocks are divided into two sets, herein referred to as the foreground set and the background set. The execution control blocks in each set are maintained in an order by the driver program. In addition, the foreground and background sets have a predetermined priority relationship in which they are to be processed. The execution control program, executing on the auxiliary processor, processes the execution control blocks in the background and foreground sets in the order maintained by the driver program and according to the predetermined priority relationship. In addition, the auxiliary processor is capable of notifying the host processor upon the completion of a task.

BRIEF DESCRIPTION OF THE DRAWINGS

The invention may best be understood by referring to the following description and accompanying drawings which illustrate the invention. In the drawings.

DETAILED DESCRIPTION

A method and apparatus for using a driver program, executing on a host processor, to control the execution of programs on an auxiliary processor is described. In the following description for purposes of explanation, specific numbers, materials and configurations are set forth in order to provide a thorough understanding of the present invention. However, it will be apparent to one skilled in the art that the present invention may be practiced without these specific details. In other instances, well known systems are shown in diagrammatic or block diagram form in order not to obscure the present invention.

Figure 1:
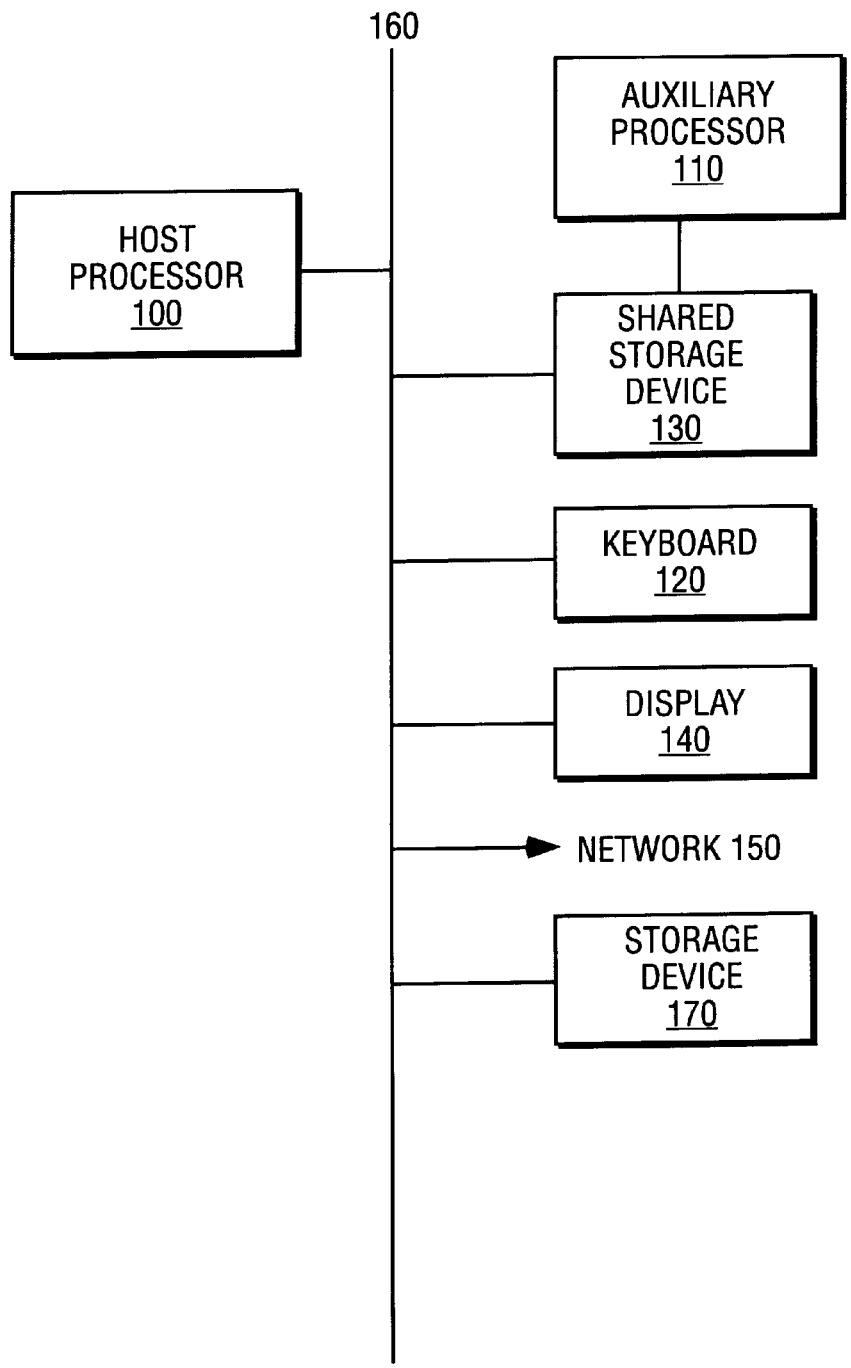
FIG. 1 is an exemplary computer system incorporating the teachings of the present invention.

Referring now to FIG. 1, a block diagram illustrating an exemplary computer system incorporating the teachings of the present invention is shown. The exemplary computer system comprises a host processor (also known as an "execution unit") 100, a shared storage device 130, a storage device 170, a network 150, and a bus 160. Host processor 100 is coupled to shared storage device 130, storage device 170, and network 150 by bus 160. In addition, a number of user input/output devices, such as a keyboard 120 and a display 140, are also coupled to bus 160. Finally, the exemplary computer system comprises an auxiliary processor (also known as an "execution unit") 110 coupled to shared storage device 130. Thus, shared storage device 130 may be accessed by both host processor 100 and auxiliary processor 110.

In one embodiment, host processor 100 is a general purpose processor for controlling the operation of the exemplary computer system, while auxiliary processor 110 is a special purpose processor for performing a particular type of data processing. In addition, auxiliary processor 110 utilizes a different instruction set than host processor 100, executing what is referred to herein as microcode programs or auxiliary processor programs. While this description is oriented toward a computer system in which auxiliary processor 110 is a special purpose processor utilizing a different instruction set, the present invention may be alternatively implemented in multiprocessor computer systems having different configurations. For example, auxiliary processor 110 may be a general purpose processor and/or utilize the same instruction set as host processor 100.

Storage device 170 and shared storage device 130 each represent one or more mechanisms for storing data. For example, shared storage device 130 may include read only memory (ROM), random access memory (RAM), and/or a magnetic disk storage medium. In one embodiment, shared storage device 130 is composed of video random access memory (VRAM).

Figure 2:
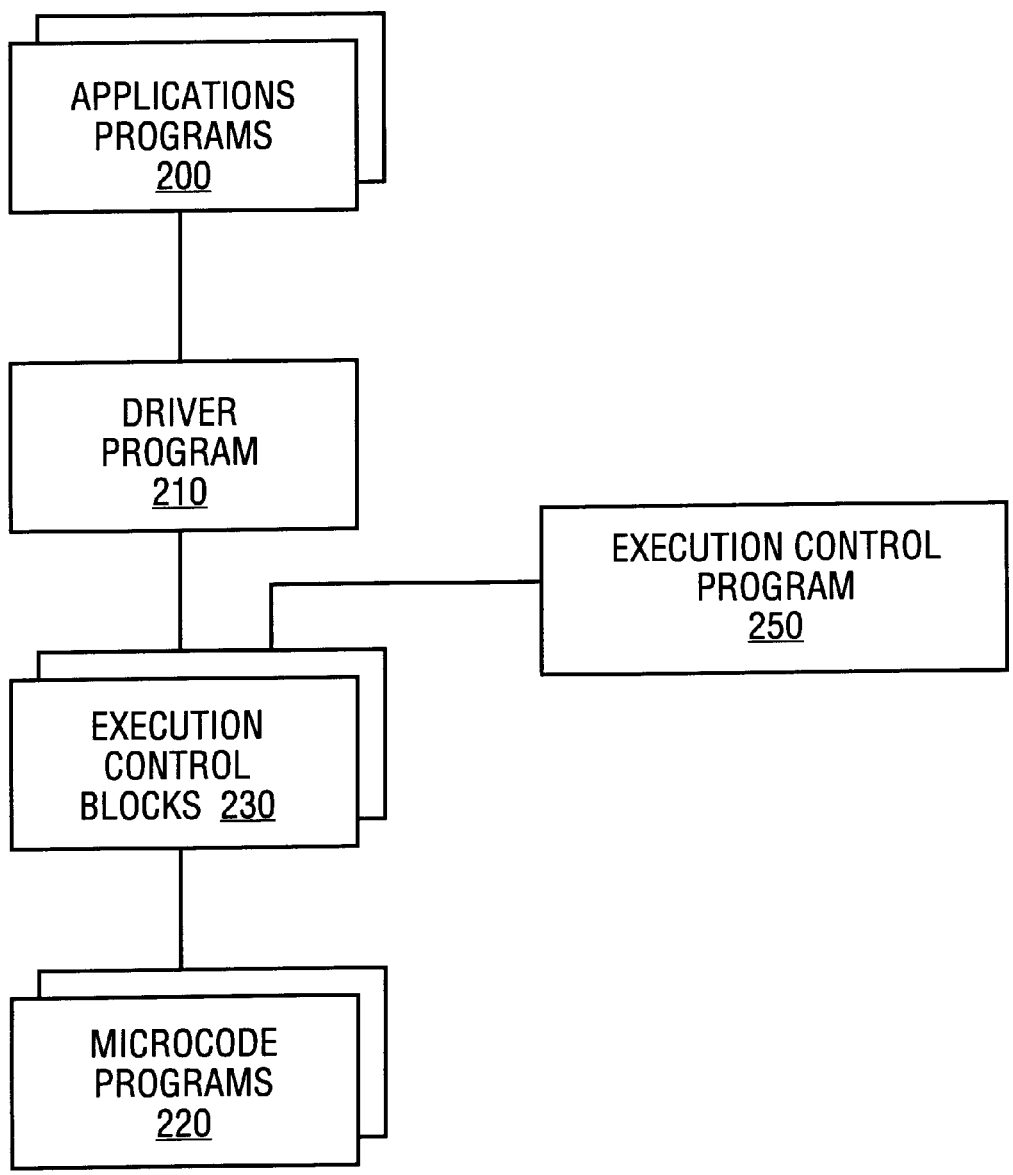
FIG. 2 illustrates the architectural relationship of the key software elements of the present invention.

Referring now to FIG. 2, a block diagram illustrating the architectural relationship of the software elements of the present invention is shown. As illustrated, the software elements include application programs 200, a driver program 210, an execution control program 250, a plurality of ordered execution control blocks 230, and a plurality of microcode programs 220, cooperating with each other as shown. In one embodiment, host processor 100 executes application programs 200 and driver program 210, while auxiliary processor 110 executes execution control program 250. In addition, execution control blocks 230 and microcode programs 220 are stored in shared storage device 130, so that auxiliary processor 110 can access them.

During their execution, application programs 200 will require the execution of different ones of microcode programs 220 depending on the current input into the computer system. To this end, application programs 200 copy microcode programs 220 into shared storage device 130, and then interface with driver program 210 identifying those of microcode programs 220 which must be executed. In response, driver program 210 generates the data structure represented by execution control blocks 230. Each of execution control blocks 230 contains information concerning one of microcode programs 220 whose execution is currently required and information for controlling the execution flow on auxiliary processor 110. Driver program 210 maintains execution control blocks 230 in the order in which their corresponding microcode programs are to be executed by auxiliary processor 110. Execution control program 250, executing on auxiliary processor 110, processes each of execution control blocks 230 in the order maintained by driver program 210 to determine what action auxiliary processor 110 should take, including which of microcode programs 220 to execute. In this manner, driver program 210 provides a single interface by which a number of different application programs may request the execution of different microcode programs on auxiliary processor 110, while execution control blocks 230 provide for communication between host processor 100 and auxiliary processor 110.

In addition, application programs 200 may require a call back routine be executed upon the completion of a microcode program. Thus, driver program 210 also provides for the execution of these call back routines upon notification from auxiliary processor 110 that their corresponding microcode program was executed.

While one architectural relationship of the software elements has been described, various alternate architectures are possible. For example, an additional interface program could be placed in-between application programs 200 and driver program 210.

Figure 3:
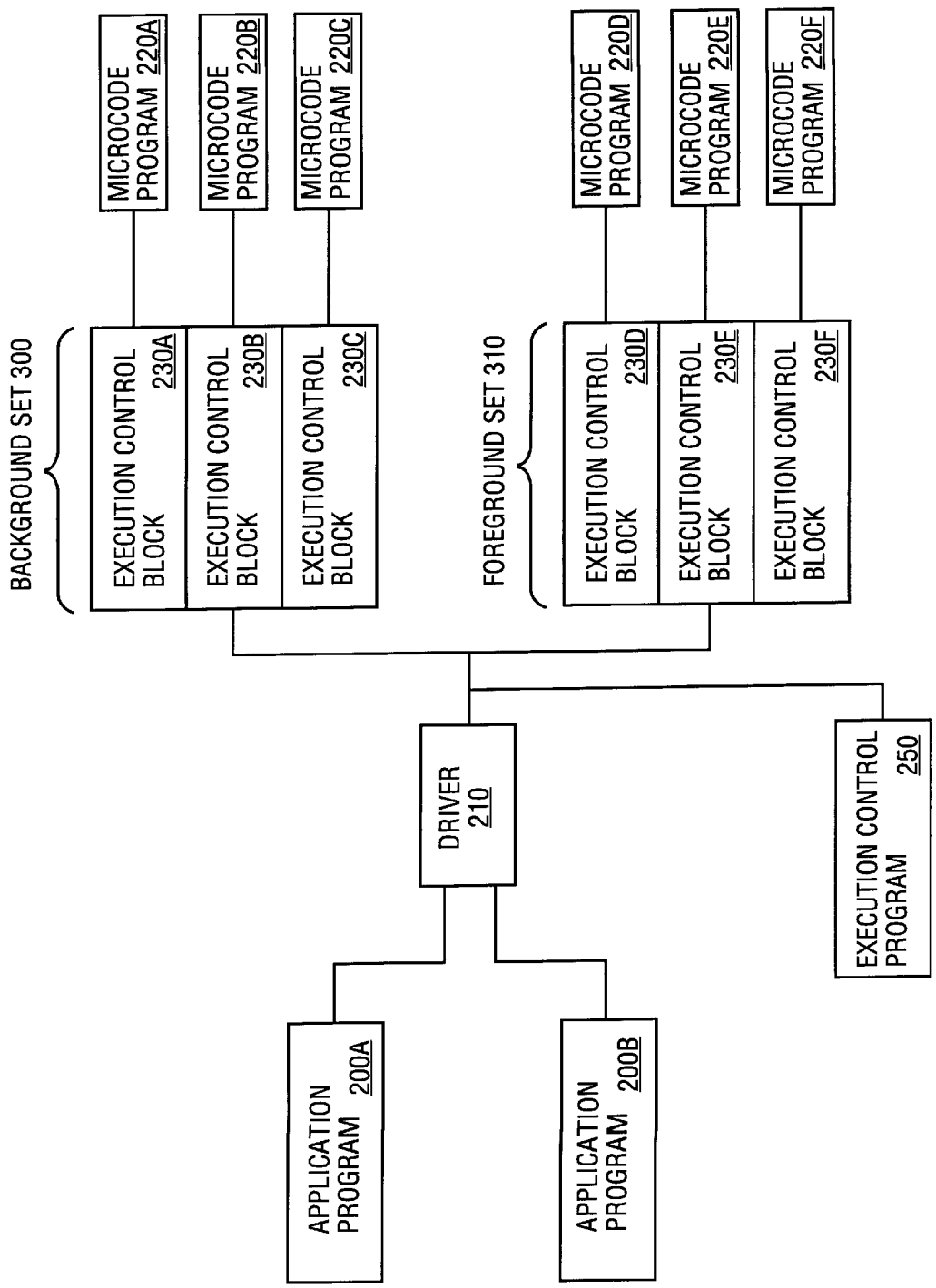
FIG. 3 is a representation of the key software elements in FIG. 2 as utilized by one embodiment of the present invention.

Referring now to FIG. 3, a representation of the software elements in FIG. 2 are shown as they are utilized by one embodiment of the present invention. FIG. 3 shows application programs 200*a* and 200*b*, driver program 210, a background set 300 including execution control blocks 230*a*–230*c*, a foreground set 310 including execution control blocks 230*d*–230*f*, microcode programs 220*a*–220*f*, and execution control program 250, cooperating as shown. Application programs 200*a* and 200*b* interface with driver program 210. Driver program 210 and execution control program 250 interface with background set 300 and foreground set 310. Microcode programs 220*a*–220*f* interface with corresponding execution control blocks 230*a*–230*f*, respectively.

As illustrated in FIG. 3, this embodiment divides execution control blocks 230 into two sets, foreground set 310 and background set 300. Foreground set 310 and background set 300 have a predetermined priority relationship in which they are to be processed by auxiliary processor 110. According to the predetermined priority relationship utilized by one embodiment, background set 300 is processed during normal operation, while foreground set 310 is processed only when a certain condition(s) (herein referred to as the "foreground condition") is met. Upon the occurrence of the foreground condition, the processing of foreground set 310 interrupts the processing of background set 300. Foreground set 310 is processed until an execution control block is reached which instructs execution control program 250 to return to processing background set 300. For example, if the present invention is utilized for video processing of the screen display, the foreground condition may include the vertical blank interrupt and/or the horizontal blank interrupt. The concepts of horizontal and vertical blank interrupts are well known in the prior art, and thus are not further described here. While the present invention is described with reference to two sets of execution control blocks, alternative embodiments of the present invention may utilize any number of sets of execution control blocks, including a single set of execution control blocks. In addition, while the present invention shall be described with reference to the predetermined priority relationship explained above, various alternative priority relationships are possible. For example, a priority relationship in which all of the execution control blocks in foreground set 310 must be processed prior to processing any in background set 300.

In addition to the predetermined priority relationship, the execution control blocks within each set are maintained by driver program 210 in the order in which they are to be processed by execution control program 250. For example, while execution control program 250 is processing background set 300, execution control blocks 230*a*–*c* are processed in the order maintained by driver program 210. However, while execution control program 250 is processing foreground set 310, execution control blocks 230*d*–*f* are processed in the order maintained by driver program 210.

Figure 4:
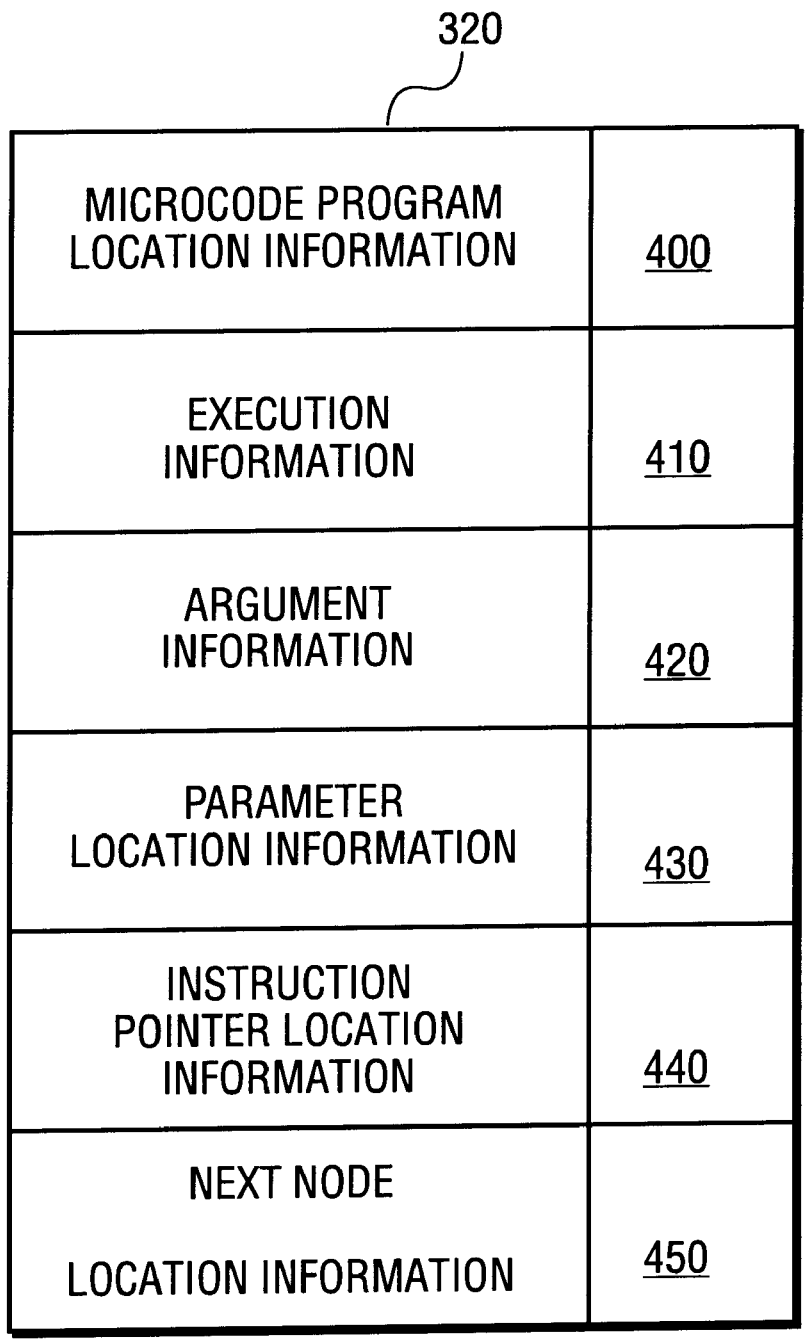
FIG. 4 is a block diagram of an execution control block for use in the present invention.

With reference to FIG. 4, a block diagram illustrating the information stored in an execution control block employed by one embodiment is shown. As illustrated, each execution control block comprises microcode program location information 400 and execution information 410. Preferably, each execution control block also contains argument information 420, parameter location information 430, instruction pointer location information 440, and next node location information 450. Microcode program location information 400 represents the location (i.e., the address) in shared storage device 130 of the execution control block's corresponding microcode program.

Execution information 410 is written and maintained by driver program 210 for controlling the execution flow on auxiliary processor 110. Execution information 410 may indicate one of a number of states, including a wait state and a continue state. Preferably, execution information 410 may also indicate a notify wait state, a notify continue state, and a return state. The wait state instructs auxiliary processor 110 to remain at the current execution control block until execution information 410 is changed. The continue state instructs auxiliary processor 110 to continue to the next execution control block in the set of execution control blocks currently being processed. The notify wait state instructs auxiliary processor 110 to notify host processor 100 upon completion of the current execution control block's corresponding microcode program and to wait at the current execution block until execution information 410 is changed. The notify continue state instructs the auxiliary processor 110 to notify host processor 100 upon the completion of the current execution control block's corresponding microcode program and to continue to the next execution block in the set of execution control blocks currently being processed. The return state, which is only used in execution control blocks in foreground set 310, instructs auxiliary processor 110 to return to processing the execution control blocks in background set 300.

Argument information 420 is used for passing arguments from application programs 200 to microcode programs 220. Inversely, parameter location information 430 is used for returning parameters from microcode programs 220 to call back routines designated by application programs 200. Instruction pointer location information 440 represents the address of a copy of auxiliary processor 110's instruction pointer, thus allowing driver program 210 to determine which of microcode programs 220 have been executed by auxiliary processor 110.

Finally, the background set 300 and foreground set 310 are each implemented using a linked list. To provide for these linked lists, next node location information 450 is used to indicate the address of the next execution control block in the list. For example, with reference to FIG. 3, next node location information 450 of execution control blocks 230a and 230b contain the address of execution control blocks 230b and 230c, respectively. In this manner, the order of the execution control blocks in both background set 300 and foreground set 310 can be easily maintained and altered. Alternatively, any number of data structures could be used to implement background set 300 and foreground set 310, including an array.

Figure 5:
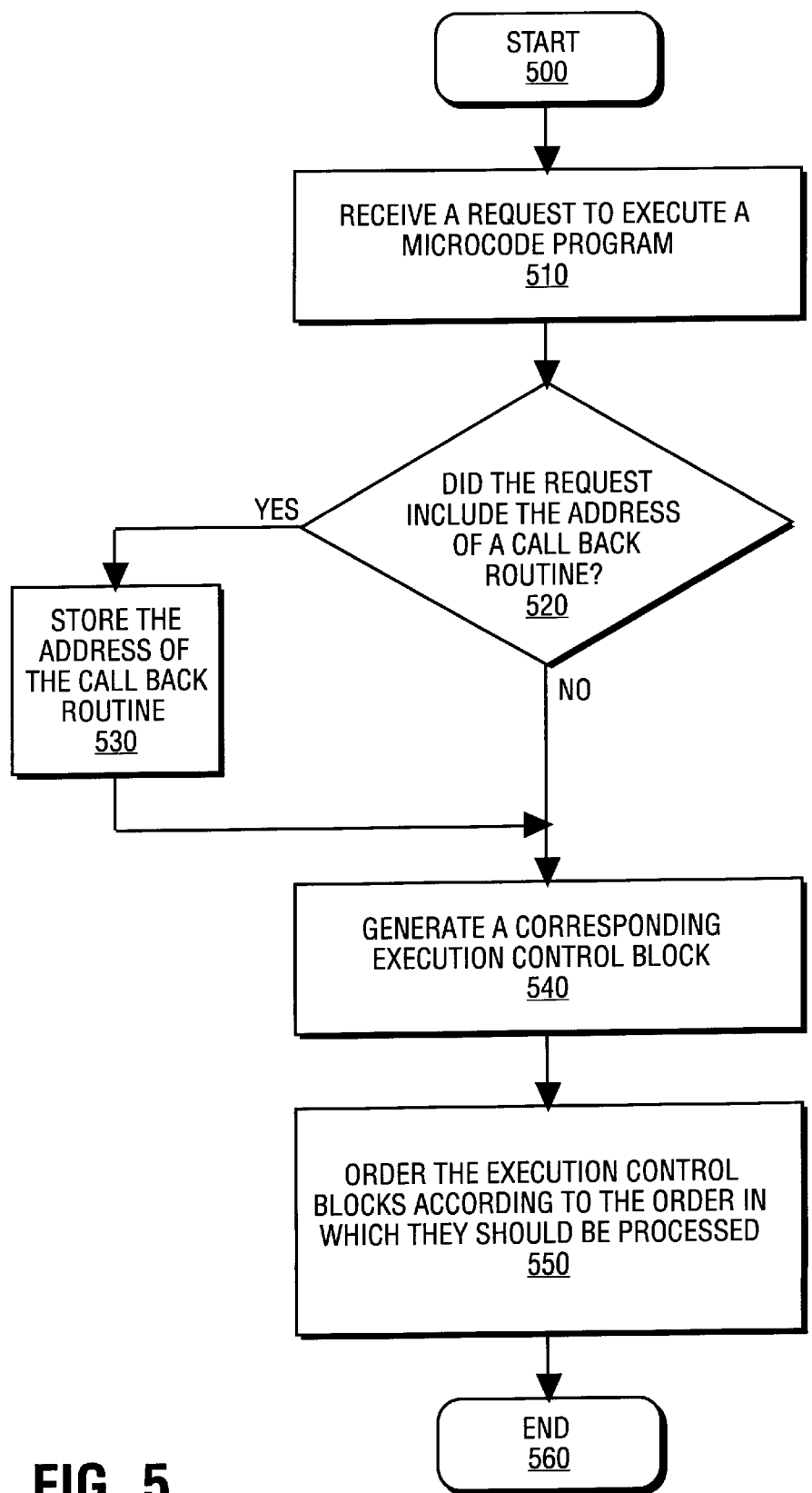
FIG. 5 is a flow diagram of the portion of the driver program which generates execution control blocks.
Figure 6:
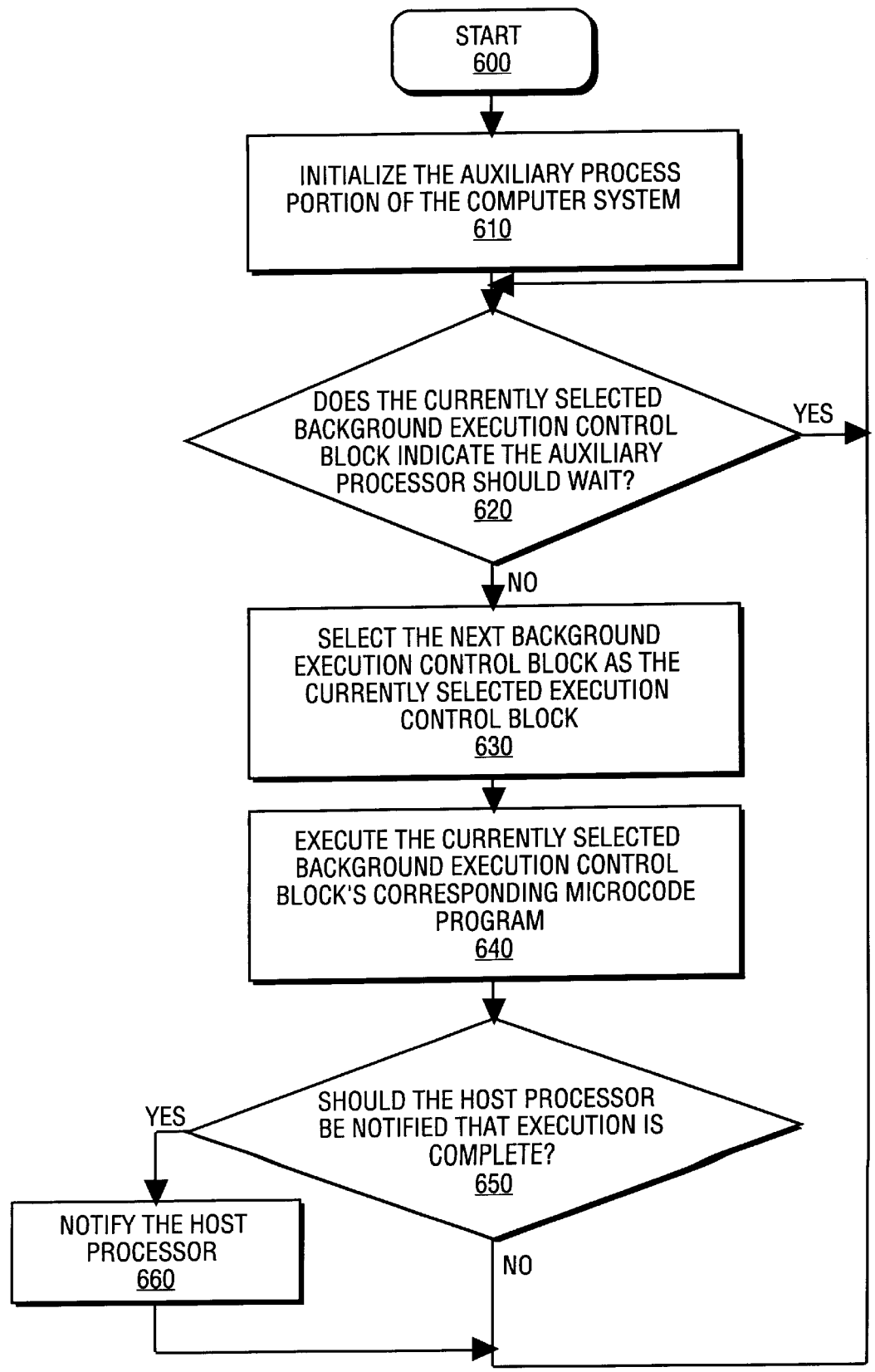
FIG. 6 is a flow diagram of the portion of the execution control program which processes the background set of execution control blocks.
Figure 7:
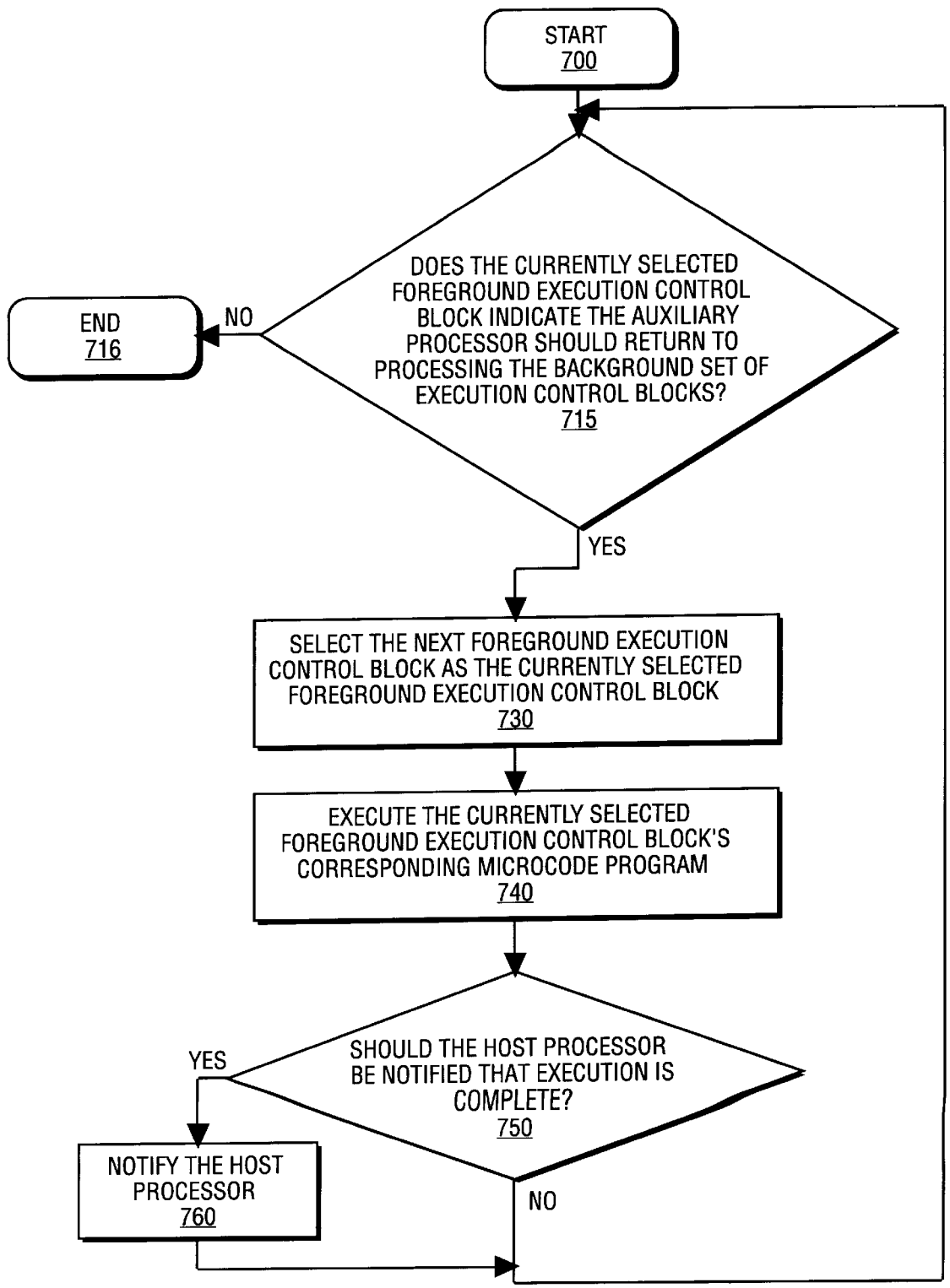
FIG. 7 is a flow diagram of the portion of the execution control program which processes the foreground set of the execution control blocks.
Figure 8:
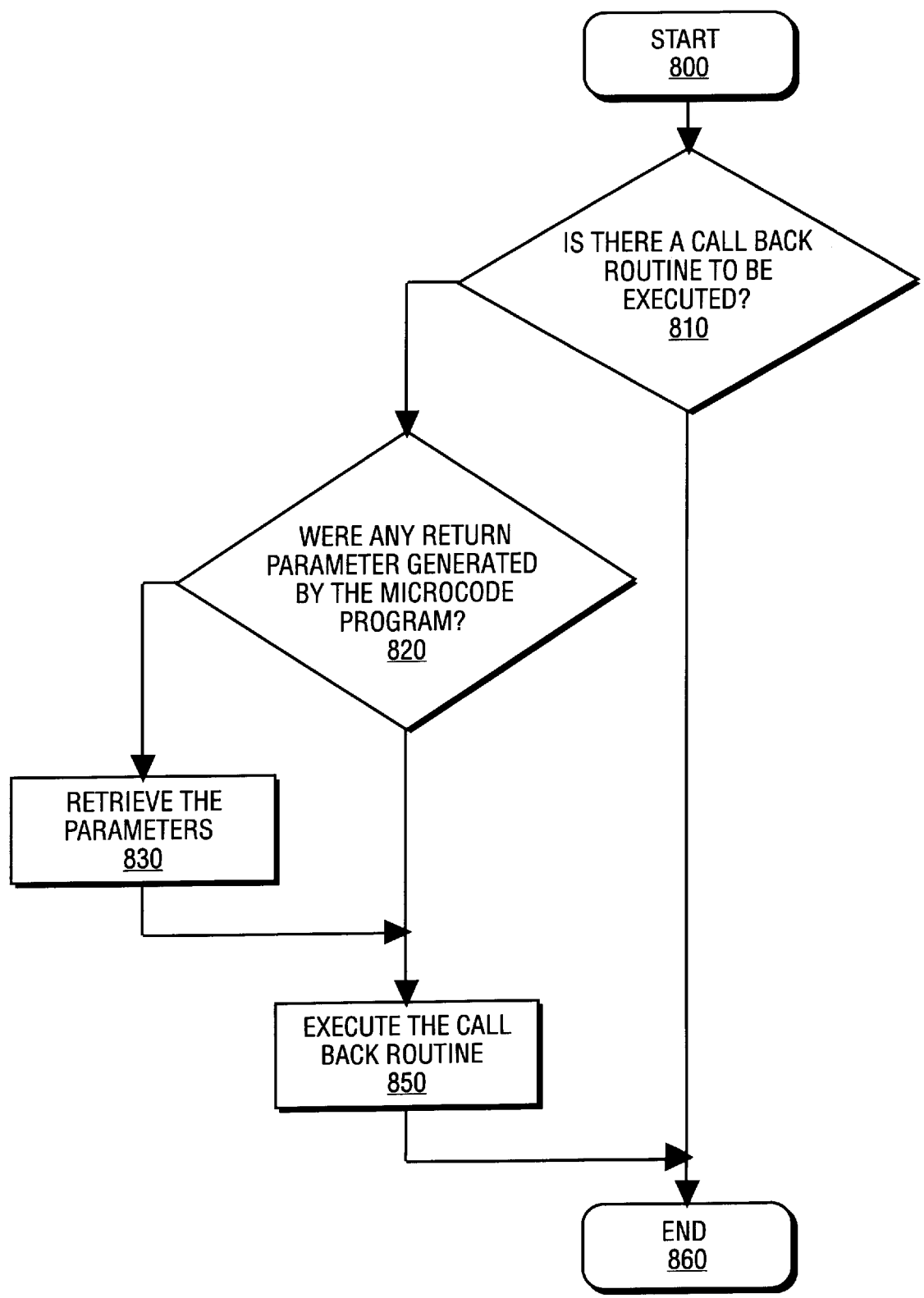
FIG. 8 is a flow diagram of the portion of the driver program which causes the execution of the call back routines.

Having described the key software elements of the present invention, the operation flow of an embodiment which utilizes the foreground and background sets of execution control blocks will now be described with reference to FIGS. 5, 6, 7, and 8. FIGS. 5 and 8 illustrate the operation of driver program 210, while FIGS. 6 and 7 illustrate operation of execution control program 250.

Referring now to FIG. 5, a flow diagram illustrating the operation of the execution control block generation portion of driver program 210 is shown starting at block 500. From block 500, flow passes to block 510.

As shown in block 510, a request is received to execute a particular microcode program and flow passes to block 520. Such requests are generated by application programs 200 and include the location information of the microcode program to be executed, the necessary execution information, and a set indication for indicating whether the microcode program should be executed from the foreground or background set of execution control blocks. In addition, this request may contain arguments for use by the requested microcode program, as well as the location of a call back routine to be executed upon notification from auxiliary processor 110 that the requested microcode program has been executed. For example, if driver program 210 receives a request from application program 200a to execute microcode program 220b, this request would at least include the address of microcode program 220b, the necessary execution information, and a set indication indicating microcode program 220b should be executed from background set 300.

At block 520, the determination is made whether the request included the address of a call back routine to be executed upon completion of the requested microcode program. If the request includes the address of a call back routine, flow passes to block 530. Otherwise, flow passes to block 540.

At block 530, the address of the call back routine in stored in a call back routine data structure. Flow then passes to block 530. This call back routine data structure may be implemented using a linked list, array, or other appropriate data structure. Each entry in the call back routine data structure corresponds to an execution control block and contains the address of the call back routine, if any, to be executed upon the completion of execution control block's corresponding microcode program. In the present example, assuming the request from application program 200a includes the address of a call back routine to be executed in response to the completion of microcode program 220b, driver program 210 stores that address in the call back routine data structure at the entry corresponding to execution control block 230b.

As shown in block 540, a corresponding execution control block is generated and flow passes to block 550. In the present example, driver program 210 would store execution control block 230b in shared storage device 130. Thus, the following would be written in execution control block 230b: 1) the address of microcode program 220b as microcode program location information 400; 2) instructions concerning the processing of execution control block 230b as execution information 410; and 3) any arguments to be used by microcode program 220b as argument information 420.

At block 550, the execution control blocks are ordered according to the order in which they should be processed by the auxiliary processor. Flow then passes to block 560 where the routine ends. The method of performing the step in block 550 depends on the data structure used to implement execution control blocks 230. As previously described, one embodiment utilizes linked lists, and thus, this method is described using linked lists. In the present example, if execution control block 230b should follow execution control block 230a, the address of execution control block 230b would be written in execution control block 230a as next node location information 450. In addition, the address of execution control block 230c would be written into execution control block 230b as next node location information 450. Thus, execution control block 230b would be inserted into background set 300 as shown in FIG. 3.

The order in which driver program 210 maintains execution control blocks 230 may be dictated by any number of different factors, including a first-in first-out order. In addition, driver program 210 may be implemented to reorder execution control blocks 230 at any time.

With reference to FIGS. 6 and 7, the operation of execution control program 250 will now be described. FIG. 6 is a flow diagram of the portion of execution control program 250 which processes background set 300, while FIG. 7 is a flow diagram of the portion of execution control program 250 which processes foreground set 310. It is worthwhile to note, that FIGS. 6 and 7 describe an embodiment in which the execution information in each foreground execution control block may indicate either the continue state, the notify continue state, or the return state, while the execution information in each background execution control block may indicate either the continue state, the notify continue state, the wait state, or the notify wait state. However, in alternative embodiments, the execution information in each foreground and background execution control block may indicate any number of states.

As previously described, the processing of background set 300 is interrupted to process foreground set 310 upon the occurrence of a foreground event. Thus, upon initialization, execution control program 250 begins processing background set 300 according to FIG. 6. However, upon the occurrence of the foreground event, the data required to return to processing the background set 300 is stored and execution control program 250 begins processing foreground set 310 as described in FIG. 7. Eventually, when the currently selected foreground execution control block indicates auxiliary processor 110 should return to processing background set 300, the data required to return to processing foreground set 310 is stored and execution control program 250 returns to processing background set 300 form where the interrupt occurred. Finally, upon each subsequent occurrence of the foreground event, auxiliary processor 110 again interrupts the processing of background set 300 and returns to processing foreground set 310.

With reference to FIG. 6, the portion of execution control program 250 which processes the background set of execution control blocks will now be described.

As shown in block 610, the auxiliary processor portion of the computer system is initialized and flow passes to block 620. One embodiment utilizes "dummy" execution control blocks to initialize the auxiliary processor portion of the system. Thus, prior to beginning the execution of execution control program 250, a background dummy execution control block and a foreground dummy execution control block are generated. The execution information 410 of the background dummy block is written to indicate the wait state, while execution information 410 of the foreground dummy block is written to indicate the go back state. To initialize the auxiliary portion of the system, these dummy execution control blocks are selected as the currently selected background and foreground execution control blocks in step 610. While this method of initializing the system is described, other methods could be used.

As shown in block 620, the determination is made whether the currently selected background execution control block indicates that the auxiliary processor should wait. If the auxiliary processor should wait, flow passes back to block 620. Otherwise, flow passes to block 630. To perform the determination in block 620, execution control program 250 inspects the currently selected execution control block's execution information 410. If it indicates the wait state or the notify wait state, the auxiliary processor waits. However, if execution information 410 indicates the continue state or the notify continue state, the auxiliary processor begins processing the next background execution control block as described below. For example, when the background dummy execution control block is the currently selected execution control block, the auxiliary processor waits at the background dummy execution control block until a real execution control block is generated. When driver program 210 generates execution control block 230a responsive to a request from application program 200a, driver program 210 writes the background dummy execution control block's next node location information 450 to indicate the address of execution control block 230a, and then alters the background dummy execution control block's execution information 410 to indicate the continue state. In this manner, the auxiliary processor portion of the system is initialized.

At block 630, the next background execution control block is selected as the currently selected background execution control block and flow passes to block 640. In the present example, the currently selected background execution control block is the dummy background execution control block. Thus, execution control program 250 selects execution control block 230a as the currently selected background execution control block using the dummy execution control block's next node location information 450.

As shown in block 640, the microcode program corresponding to the currently selected background execution control block is executed and flow passes to block 650. The step in block 640 is performed by executing the microcode program identified by microcode program location information 400 with any arguments identified by argument information 420. In the present example, microcode program 220a is executed on auxiliary processor 110. A number of methods could be used to pass arguments using argument information 420. For example, argument information 420 may itself contain the arguments.

During the execution of a microcode program, auxiliary processor 110 stores a copy of its instruction pointer in shared storage device 130 and stores the address of that copy in the currently selected execution control block's instruction pointer location information 440. In addition, upon completing the execution of a microcode program, any return parameters generated by the microcode program are written in shared storage device 130 and the location information of those parameters is stored in parameter location information 430 of the currently selected execution control block. In this manner, auxiliary processor 110 returns any parameters generated by the executed microcode program. Although, one method of returning parameters is described, a number of methods for returning parameters could be used, including the storage of the parameters in the currently selected background execution control block.

At block 650, the determination is made whether the host processor should be notified that execution of the microcode program is complete. If the host processor should be notified, flow passes to block 660. Otherwise, flow passes to block 620. In the present example, execution control program 250 accesses execution information 410 of background execution control block 230a to determine if the host processor should be notified. If execution information 410 indicates the notify wait state or the notify continue state, the host processor should be notified that execution is complete.

As shown in block 660, the host processor is notified that execution of the microcode program is complete. Flow then passes to block 620. In the present example, host processor 100 is notified that execution of microcode program 220a is complete. In one embodiment, this notification is provided for by causing auxiliary processor 110 to signal a hardware interrupt to host processor 100. Interrupts are well know in the prior art and will not be future discussed here. While one method of providing for this notification is described, a number of other methods could be implemented, including polling a shared memory location.

Upon returning to block 620, the determination is again made whether the auxiliary processor should wait at the currently selected background execution control block by examining its' execution information 410. If the auxiliary processor should wait, flow passes back to block 620. Otherwise, flow passes to block 630 and the next background execution control block is processed as previously described. In the present example, auxiliary processor 110 waits at background execution control block 230a until its execution information 410 indicates the continue state or the notify continue state. With reference to FIG. 7, the portion of execution control program 250 which processes the foreground set of execution control blocks will now be described.

As shown in block 715, the determination is made whether the currently selected foreground execution control block indicates the auxiliary processor should return to processing the background set of execution control blocks. If the currently selected foreground execution control block indicates the auxiliary processor should return, flow passes to block 716. Otherwise, flow passes to block 730. The determination in block 715 is made by accessing execution information 410 of the currently selected foreground execution control block. If this execution information indicates the go back state, the auxiliary processor should return to processing the background set of execution control blocks. For example, when the system initialized, the currently selected foreground execution control block is the foreground dummy execution control block which indicates the go back state. As a result, the auxiliary processor continually returns to processing the background set of execution control blocks until a real execution control block is generated. However, when driver program 210 generates foreground execution control block 230d, driver program 210 writes the foreground dummy execution control block's next node location information 450 to indicate the address of execution control block 230d, and then writes the foreground dummy execution control block's execution information 410 to indicate the continue state. In this manner, foreground set 310 is initialized. While one embodiment employs the described method to initialize foreground set 310, other methods could be used.

At block 716, the routine ends and auxiliary processor 110 returns to processing the background set of execution control blocks. To perform block 716, the auxiliary processor stores the data required to return to processing foreground set 310 and returns to processing background set 300 from the point where that processing was interrupted.

At block 730, the next foreground execution control block is selected as the currently selected foreground execution control block and flow passes to block 740. In the present example, the currently selected background execution control block is the dummy foreground execution control block. Thus, execution control program 250 selects execution control block 230d as the currently selected foreground execution control block using the dummy foreground execution control block's next node location information 450.

As shown in block 740, the microcode program corresponding to the currently selected foreground execution control block is executed and flow passes to block 750. The step in block 740 is performed by executing the microcode program identified by microcode program location information 400 with any arguments identified by argument information 420. In the present example, microcode program 220d is executed on auxiliary processor 110.

At block 750, the determination is made whether the host processor should be notified that execution of the microcode program is complete. If the host processor should be notified, flow passes to block 760. Otherwise, flow passes to block 715. In the present example, execution control program 250 accesses execution information 410 of foreground execution control block 230d to determine if the host processor should be notified. If execution information 410 indicates the notify continue state, the host processor should be notified that execution is complete.

As shown in block 760, the host processor is notified that execution of the microcode program is complete. Flow then passes to block 715. In the present example, host processor 100 is notified that execution of microcode program 220d is complete. In one embodiment, such notification is provided for as previously described with reference to block 660.

Upon returning to block 715, the determination is again made whether the auxiliary processor should return to processing background set 300. If the auxiliary processor should return, the data required to return to processing foreground set 310 is stored and execution control program 250 returns to processing background set 300 from where the interrupt occurred. Otherwise, the auxiliary processor continues to process foreground set 310.

In the manner described above, driver program 210 indirectly controls the execution of the requested microcode programs on auxiliary processor 110 by altering execution information 410 and the order of background execution control blocks 230.

With reference to FIG. 8, a flow diagram illustrating the operation of the call back routine portion of driver program 210 is shown. In one embodiment, upon receiving the hardware interrupt generated by auxiliary processor 110 in block 650 of FIG. 6 notifying host processor 100 that the execution of a microcode program is complete, the interrupt handler mechanism of host processor 100 calls the call back routine portion of driver program 210. In response, driver program 210 causes the execution of the microcode program's corresponding call back routine as described below. Interrupt handler mechanisms are well known in the prior art, and thus are not further described here.

At block 810, the determination is made whether a call back routine is to be executed. If a call back routine is to be executed, flow passes to block 820. Otherwise flow passes to block 860 where the routine ends. For example, if application program 200a requested a call back routine be executed in response to the completion of microcode program 220a, the request would have contained the address of that call back routine. Therefore, driver program 210 would have stored that address in the call back routine data structure at the entry corresponding to execution control block 230a (as described in block 530). Thus, driver program 210 inspects this entry to make the determination in block 810.

As shown in block 820, the determination is made whether any return parameters were generated by the executed microcode program. If there were return parameters generated, flow passes to block 830. Otherwise, flow passes to block 850. In the present example, if microcode program 220a generated a parameter during its execution, it would have stored information identifying that parameter in parameter location information 430 as previously described. Therefore, if parameter location information 430 identifies a parameter, a parameter was generated.

As shown in block 830, the return parameters generated by the executed microcode program are retrieved. Flow then passes to block 840. In the present example, driver program 210 retrieves the return parameters generated by microcode program 220a using parameter location information 430 of execution control block 230a.

At block 850, the call back routine is executed on host processor 100 using any return parameters which were generated by the microcode program. Flow then passes to block 860.

In this manner, driver program 210 also allows application programs 200 to designate call back routines to be executed upon the completion of microcode programs 220.

AN EXEMPLARY APPLICATION OF THE PRESENT INVENTION

An exemplary application of the present invention utilizes driver program 210 as the video driver for a video hardware subsystem, such as a video-processing card with a version of the Intel®i750® Pixel Processor. Such a system is described in the U.S. patent application entitled: "Computer-Implemented Process, Video Hardware Subsystem, and Computer System for Displaying Full-Screen Video Images" having a Ser. No. 08/152,448 and a filing date of Nov. 12, 1993; "Driver, Computer-Implemented Process, and Computer System for Processing Data Using Loadable Microcode Running on a Programmable Processor" having a Ser. No. 08/152,348 and a filing date of Nov. 12, 1993; "Video Driver, Computer-Implemented Process, and Computer System for Processing Video Data Using Loadable Compression/Decompression Microcode Running on a Video Hardware Subsystem" having a Ser. No. 08/152,447 and a filing date of Nov. 12, 1993; and "Computer-Implemented Process and Computer System for Raster Displaying Video Data Using Foreground and Background Commands" having a Ser. No. 08/152,347 and a filing date of Nov. 12, 1993; which are hereby fully incorporated by reference.

In this exemplary application, the computer system contains a host processor (e.g., an Intel® 486 microprocessor) and an auxiliary processor (e.g., the Intel® i750® Pixel Processor). The host processor runs application programs analogous to application programs 200. These application programs copy microcode programs (e.g., video compression/decompression algorithms) for execution on the auxiliary processor into a memory accessible by both the auxiliary processor and the host processor. In addition, these application programs interface with the video driver through a general purpose video software program (e.g., a version of Microsoft® Video for Windows software also running on the host processor) to request the execution of the copied microcode programs. In response, the video driver generates execution control blocks (also referred to as vblocks) to indirectly control the execution of the microcode programs on the auxiliary processor. The auxiliary processor executes an execution control program, analogous to execution control program 250, which processes the execution control blocks in the order maintained by the video driver.

In this manner, the video driver permits a user to program the video hardware subsystem easily by allowing the user to choose to compress and/or decompress video data using algorithms provided with the video hardware subsystem or using alternative algorithms provided by the user. The user may also use the video driver to program the video hardware subsystem to implement functions other than video compression and decompression.

ALTERNATIVE EMBODIMENTS

While the present invention has been described in terms of the preferred and alternative embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. An apparatus comprising:

a storage device to store a plurality of programs, and a first and second plurality of ordered execution control blocks, each or said first and second plurality of execution control blocks comprising location information of a corresponding one of said plurality of programs;

a driver program to store said first and second plurality of execution control blocks in said storage device;

an execution control program to cause said plurality of programs to be executed in order in accordance to said first plurality of ordered execution control blocks until a predefined condition is met, then in order in accordance to said second plurality of execution control blocks until an execution control block is reached which instructs the execution control program to return to processing said first plurality of execution control blocks; and a host and an auxiliary processor both coupled to share said storage device, said host processor to execute said driver program, said auxiliary processor to execute said execution control program and said plurality of programs.

2. The apparatus of claim 1, wherein upon completion of one of said plurality of programs, said execution control program further causes said auxiliary processor to notify said host processor that said one of said plurality of programs has completed.

3. The apparatus of claim 2, wherein at time of notification of said host processor, said execution control program further causes said auxiliary processor to wait before executing another program of said plurality of programs.

4. The apparatus of claim 1, wherein said host processor executing said driver program is further used to control execution of said execution control program on said auxiliary processor; and said control is provided by execution information stored in each of said first plurality of ordered execution control blocks, said execution information indicates one of a plurality of states, said plurality of states including a wait state and a continue state, said wait state to indicate said auxiliary processor should pause execution of said execution control program, said continue state to indicate said auxiliary processor should continue execution of said execution control program.

5. The apparatus of claim 4, wherein said auxiliary processor is further used to notify, said host processor responsive to said execution control program.

6. The apparatus of claim 4, wherein said plurality of states further includes a notify wait state and a notify continue state, said notify wait state to indicate said auxiliary processor should pause execution of said execution control program and notify said host processor, said notify continue state to indicate said auxiliary processor should notify said host processor and continue execution of said execution control program.

7. The apparatus of claim 1, wherein
a first of said first plurality of ordered execution control blocks has stored therein argument information to identify an argument for use by said auxiliary processor in execution of said corresponding of said plurality of programs.

8. The apparatus of claim 1, wherein
a first of said first plurality of ordered execution control blocks has stored therein parameter information to identify a parameter generated during execution of said corresponding one of said plurality of progarms.

9. The apparatus of claim 1, wherein
said auxiliary processor operates using an instruction pointer; and
each of said first plurality of ordered execution control blocks further comprise information concerning said instruction pointer.

10. The apparatus of claim 1, wherein
a first execution control block of said first plurality of ordered execution control blocks, comprises location information of a first program of said plurality of programs, and location information of a call back routine, said call back routine being executed on said host processor responsive to completion of execution of said first program on said auxiliary processor.

11. The apparatus of claim 1, wherein
said auxiliary processor is for video processing or a screen display and said predefined condition is one of a vertical blank and horizontal blank interrupt.

12. The apparatus of claim 10, wherein:
said call back routine is executed by said host processor upon notification by said auxiliary processor of completion of execution of said first program.

13. The apparatus of claim 1, wherein:
said auxiliary processor controls a peripheral device; and
said plurality of programs comprise a program directed toward operation of said peripheral device.

14. The apparatus of claim 1, wherein:
upon completion of one of said plurality of programs, the auxiliary processor waits until instructed by said host processor to execute a next program of said plurality of programs.

15. The apparatus of claim 14, wherein:
upon completion of one of said plurality of programs, said auxiliary processor notifies said host processor of completion of execution of said one of said plurality of programs.

16. A computer-implemented method comprising:
storing a first and second plurality of execution control blocks in a storage device responsive to executing a driver program on a host processor, each execution control block in said first and second plurality of execution control blocks containing location information of at least one of a plurality of programs, said first and second plurality of execution control blocks each having an order;
executing programs from said plurality of programs on an auxiliary processor in accordance with said order of said first plurality of execution control blocks until a predetermined interrupt, wherein said storage device is shared by said host and auxiliary processor; and
executing programs from said plurality of programs on said auxiliary processor in accordance with said order of said second plurality of execution control blocks until an execution control block is reached which indicates said auxiliary processor is to return to processing said first plurality of execution control blocks.

17. The method of claim 16 further comprising:
storing in a first execution control block of said first plurality of execution control blocks execution information that causes said auxiliary processor to wait at said first execution control block; and
altering said execution information in said first execution control block to cause said auxiliary processor to continue executing programs from said plurality of programs in accordance with said order of said first plurality of execution control blocks.

18. The method of claim 16 further comprising:
storing in a first execution control block of said first plurality of execution control blocks information identifying a call back routine; and
executing said call back routine on said host processor responsive to completion of execution of the one or more programs in said plurality of programs identified by said location information in said first execution control block.

19. The method of claim 16
wherein said auxiliary processor is for video processing of a screen display and said predefined interrupt is one of a vertical blank and horizontal blank interrupt.

20. A machine readable medium having stored thereon data representing a set of one or more sequences of instructions, which when executed by an auxiliary processor, cause said auxiliary processor to perform the following:
retrieving a first and second plurality of execution control blocks from a storage device, said first and second plurality of execution control blocks each having been stored in a manner indicating an order by a host processor executing a driver program, each execution control block of said first and second plurality of execution control blocks comprising location information of at least one of a plurality of programs;
executing programs of said plurality of programs on said auxiliary processor in accordance with said order of said first plurality of execution control blocks until a predetermined interrupt, each program in said plurality of programs including one or more sequences of executable instructions, wherein said storage device is shared by said host and auxiliary processor; and
executing programs of said plurality of programs on said auxiliary processor in accordance with said order of said second plurality of execution control blocks until a control block is reached which indicates said auxiliary processor is to return to processing said first plurality of execution control blocks.

21. The machine readable medium of claim 20, wherein:
a first execution control block of said plurality of execution control blocks contains status information indicating a wait status; and
wherein said executing programs of said plurality of programs on said auxiliary processor in accordance with said order of said first plurality of execution control blocks comprises:
waiting at said first execution control block until said status information is altered to a continue state.

22. The machine readable medium of claim 20, wherein:
said auxiliary processor is for video processing of a screen display and said predefined interrupt is one of a vertical blank and horizontal blank interrupt.

23. An apparatus comprising:

a host and auxiliary processor coupled to share a memory, wherein said auxiliary processor is for video processing of a screen display;

said memory to store a plurality of programs, and a first and second plurality or ordered execution control blocks, each of said first and second plurality of execution control blocks comprising location information of a corresponding one of said plurality of programs, each of said ordered execution control blocks including execution information indicating one of a plurality of states, said plurality of states including a wait state, a continue state, and a return state;

a driver program, for execution by said host processor, to store said first and second plurality of execution control blocks in said storage device;

an execution control program, for execution by said auxiliary processor, to cause programs of said plurality of programs to be executed in order in accordance to said first plurality of ordered execution control blocks until one or a horizontal and vertical blank interrupt, then in order in accordance to said second plurality of ordered execution control blocks until an execution control block is reached whose execution information indicates a return state instructing said execution control program to return to processing said first plurality of ordered execution control blocks, said wait state to indicate said auxiliary processor should pause execution of said execution control program, said continue state to indicate said auxiliary processor should continue execution of said execution control program.

24. The apparatus of claim 23, wherein a first of said first plurality of ordered execution control blocks has stored therein argument information to identify an argument for use by said auxiliary processor in execution of said corresponding one of said plurality of programs.

25. The apparatus of claim 23, wherein a first of said first plurality of ordered execution control blocks has stored therein parameter information to identify a parameter generated during execution of said corresponding one of said plurality of programs.

26. The apparatus of claim 23, wherein a first execution control block of said first plurality of ordered execution control blocks, comprises location information of a first program of said plurality of programs, and location information of a call back routine, said call back routine being executed on said host processor responsive to completion of execution of said first program on said auxiliary processor, said call back routine being executed by said host processor upon notification by said auxiliary processor of completion of execution of said first program.

27. An apparatus comprising:

a storage device to store one or more sequences of executable instructions corresponding to a first plurality of programs to be executed, and a first plurality of ordered execution blocks corresponding it said first plurality of programs, each of said first plurality of execution control blocks comprising location information of said corresponding one of said first plurality of programs in said storage device;

a driver program to generate and store said first plurality of corresponding execution control blocks in said storage device;

an execution control program to cause said first plurality of programs to be executed in order in accordance with said first plurality of ordered execution control blocks; and a host and an auxiliary processor both coupled to said storage device, said host processor to execute said driver program, said auxiliary processor to execute said execution control program and said first plurality of programs.

28. A machine-readable medium having stored thereon data representing a set of one or more sequences of instructions, which when executed by an auxiliary processor, cause said auxiliary processor to perform the following:

retrieving a plurality of execution control blocks from a storage device, said plurality of execution control blocks each having been generated and stored in an order by a host processor executing a driver program, each of said plurality of execution control blocks comprising location information of at least one of a plurality of programs; and executing programs of said plurality of programs on said auxiliary processor in accordance with said order of said plurality of execution control blocks, each program in said plurality of programs including one or more sequences of executable instructions, wherein said storage device is shared by said host and auxiliary processor.

* * * * *

UNITED STATES PATENT AND TRADEMARK OFFICE
CERTIFICATE OF CORRECTION

PATENT NO.    : 6,163,793
DATED         : December 19, 2000
INVENTOR(S)   : Gerber et al.

It is certified that error appears in the above-identified patent and that said Letters Patent is hereby corrected as shown below:

<u>Column 13,</u>
Line 28, delete "or", insert -- of --.

Signed and Sealed this

Second Day of July, 2002

*Attest:*

*Attesting Officer*

JAMES E. ROGAN
*Director of the United States Patent and Trademark Office*